(12) United States Patent
Flautner

(10) Patent No.: US 7,134,031 B2
(45) Date of Patent: Nov. 7, 2006

(54) PERFORMANCE CONTROL WITHIN A MULTI-PROCESSOR SYSTEM

(75) Inventor: Krisztian Flautner, Cambridge (GB)

(73) Assignee: ARM Limited, Cambridge (GB)

( * ) Notice: Subject to any disclaimer, the term of this patent is extended or adjusted under 35 U.S.C. 154(b) by 431 days.

(21) Appl. No.: 10/633,360

(22) Filed: Aug. 4, 2003

(65) Prior Publication Data

US 2005/0034002 A1 Feb. 10, 2005

(51) Int. Cl.
G06F 1/26 (2006.01)

(52) U.S. Cl. ............... 713/322; 713/300; 713/320; 307/82; 708/520

(58) Field of Classification Search ............. 713/300, 713/320, 322; 307/82; 708/520
See application file for complete search history.

(56) References Cited

U.S. PATENT DOCUMENTS 5,627,412 A * 5/1997 Beard .................. 307/82
5,812,860 A * 9/1998 Horden et al. ............ 713/322
6,141,762 A * 10/2000 Nicol et al. .............. 713/300
2002/0083356 A1* 6/2002 Dai ......................... 713/322
2002/0095610 A1* 7/2002 Nunomura ............... 713/322
2002/0188877 A1* 12/2002 Buch ....................... 713/320
2003/0014457 A1* 1/2003 Desai et al. .............. 708/520
2003/0135768 A1* 7/2003 Knee et al. ............... 713/300

* cited by examiner

Primary Examiner—Thomas Lee
Assistant Examiner—Sean Weinman
(74) Attorney, Agent, or Firm—Nixon & Vanderhye P.C.

(57) ABSTRACT

A multi-processing system 2 measures the degree of parallelism achieved in executing program instructions and uses this to dynamically control the clock speeds and supply voltage levels applied to different processor cores 4, 6 so as to reduce the overall amount of energy consumed by matching the processing performance achieved to the clock speeds and voltage levels used.

60 Claims, 8 Drawing Sheets

PERFORMANCE CONTROL WITHIN A MULTI-PROCESSOR SYSTEM

BACKGROUND OF THE INVENTION

1. Field of the Invention

This invention relates to the field of data processing systems. More particularly, this invention relates to data processing systems including multiple processors for which it is desired to control the performance.

2. Description of the Prior Art

It is known to provide multi-processing systems including a plurality of processors operating to execute respective streams of program instructions. Examples of such multi-processing systems are SPARC computer systems, IBM370 computer systems and, multi-processor personal computers running multi-processing aware operating systems such as Windows XP. The use of multi-processing is conventionally associated with high performance systems in which it is desired to execute a large number of program instructions in a small amount of time. Thus, multi-processing systems tend to be associated with mainframe computers, servers, high performance workstation computers and high performance personal computers. Within such systems it is normal to provide multiple processor cores each operating at their maximum possible clock speed and executing respective streams of program instructions.

In contrast to the high performance multi-processing environments discussed above, it is also known to provide uni-processing systems which utilise selectable clock speeds so as to reduce energy consumption. Known examples of such systems are the Speedstep processors produced by Intel Corporation, the Crusoe processors operating under control of Longrun software as produced by Transmeta Corporation and the Intelligent Energy Management systems produced by ARM Limited. In these systems the clock speed and operating voltage level is adjusted between different settings. At a lower clock speed and with a lower operating voltage the processor is capable of executing fewer instructions in a given period of time, but consumes significantly less power. This is an important advantage in power constrained environments, such as portable computing devices. Thus, it is possible with implementations of the Speedstep processors to detect whether or not a portable computer is currently connected to a mains power supply or is operating on a battery power supply. When operating on a battery power supply a lower clock speed and a lower operating voltage is used by the processor core to reduce the specific energy consumption in relation to the program instructions executed. The Longrun software and IEM system provides a more sophisticated degree of control over the processor core in that the processor core may be switched between several different clock speeds and operating voltage levels in dependence upon the detected processing workload of the processor core at that time such that when the workload is low the processor core is switched into a low specific energy consumption configuration and when the workload is high the processor core is switched into a configuration which consumes more energy, but yields higher processing performance.

SUMMARY OF THE INVENTION

Viewed from one aspect the present invention provides apparatus for processing data, said apparatus comprising:

a plurality of processors operable to execute respective streams of program instructions, said respective streams of program instructions being separate processing threads within a multi-processing environment; and a clock speed controller operable to select one of a plurality of different non-zero clock speeds as a clock signal controlling execution of program instructions by at least one of said processors, whereby said clock speed may be reduced by said clock speed controller to reduce energy consumption of said apparatus in accordance with a required processing rate of said apparatus.

The present invention runs counter to the technical prejudice in the field in that it employs multi-processing techniques using a plurality of processors in an environment in which it is desired to reduce energy consumption. The system recognises that it is possible to use more than one processor each operating at a slower clock speed than a single processor would to execute program instructions at the same combined rate would be obtained using a single processor executing at a higher clock speed and yet the two or more processors in total consume less energy than the single processor. This energy saving is achieved despite the additional overhead associated with multi-processing including additional required hardware and additional program instructions which require execution to manage the multi-processing. Furthermore, the present technique provides that at least one of the processors is operated at a selectable one of a plurality of different non-zero clock speeds. Thus, the overall rate of program instruction execution achieved by the plurality of processors can be adjusted to match the required rate of processing.

In preferred embodiments of the invention the clock speed controller serves to dynamically control the selected clock speed so as to enable the required processing rate to be achieved. Thus, the system can provide a processing performance matched to the effectively instantaneous processing rate required in a manner which reduces energy consumption and yet gives the appearance of permanent high performance operation.

Whilst the clock speed controller could base its control upon a variety of different detected or calculated parameters, in preferred embodiments of the invention the clock speed controller is responsive to a detected level of parallelism between respective streams of program instructions to dynamically select the clock signal. Other performance setting algorithms may also be used, such as the system just meeting required performance parameters. This control technique is strongly advantageous. It has been found that when a high degree of parallelism is present, this indicates that the workload is being efficiently shared between the processors and the speed of the processors can accordingly be reduced whilst maintaining the overall rate of program instruction execution compared to the program running on a uni-processor.

It will be appreciated that the degree of parallelism may be detected in a variety of different ways including a dedicated hardware circuit detecting parallel processing activity of the plurality of processors or a parallelism detecting algorithm executing on one or more of the processors.

The degree of parallelism can be determined in a variety of different ways, but is preferably a detected level of thread level parallelism. One particularly preferred way of determining this is to measure how many parallel threads, which may be from independent processes or from a single process, are executing in parallel for periods when at least one such thread is executing. This technique is resistant to giving inappropriate results due to idle behaviour of one or more of the processors.

Whilst it will be appreciated that the present technique could be used when only one of the processors is subject to a selectable non-zero clock speed, the technique is particularly useful when several of the processors, or more preferably all of the processors, are responsive to a clock signal which may be selected to have different speeds by the clock speed controller.

A relatively simple to implement embodiment is one in which the plurality of processors share a common clock speed and a common clock source. Such an embodiment simplifies clock domain and voltage domain design problems.

In more sophisticated embodiments it is possible that the different processors may have independently adjustable clock speeds and indeed may operate in independent voltage domains each matched to their respective clock speed.

Whilst the present technique could be employed with processors which are formed on separate integrated circuits, it is particularly useful in embodiments in which the processors performed of a single integrated circuit as this allows tight control of the clock speeds being used, voltage levels supplied and the like.

The clock speed controller may be provided in the form of a dedicated hardware unit. However, in preferred embodiments the clock speed controller is provided in the form of a clock speed controlling algorithm executing on at least one of the processors. This algorithm may execute on a single processor or may execute at different times upon multiple processors. The algorithm is conveniently provided as part of an operating system kernel.

In preferred embodiments of the invention the processors are provided to have characteristics that enable them to meet the maximum required processing workload when they are operating at their maximum clock speeds with a minimum assumed level of parallelism. When the system is able to meet its processing requirements in these circumstances, the present technique is used to exploit greater degrees of parallelism which may be possible to reduce the clock speeds required and accordingly reduce the energy consumption.

Whilst it will be appreciated that energy consumption may be reduced by controlling clock speed alone, the control of clock speed to lower levels also permits the supply voltage level to be lowered in a manner which is strongly advantageous in further reducing energy consumption. Accordingly, the clock speed controller in preferred embodiments is also operable to reduce the supply voltage level as the clock speed is reduced to a processor and/or adaptive body biasing may be used as the clock speed decreases.

In preferred embodiments one or more of the processors may be placed into a sleep mode when the processing load is sufficiently low. In order to wake from this sleep mode the clock speed controller operates to determine a potential level of parallelism as being above a threshold level of parallelism and then wakes the sleeping processor such that parallel execution may commence in a manner which will allow overall clock speeds to be reduced and accordingly energy consumption reduced.

It will be appreciated that the processors can take a wide variety of different forms. The invention is particularly well suited to embodiments in which the processors comprise a plurality of general purpose processor cores, such as a plurality of ARM processor cores. However, the invention is also applicable to mixed processor environments when the processors may include one or more of a general purpose processor core, a re-configurable processor core (e.g. an FPGA core), a hardware accelerator engine, an application specific processor core (e.g. a general purpose processor core extended with application specific instructions) and a digital signal processor core (such as a dedicated telecommunications DSP).

In preferred embodiments the clock speed controller is operable to reduce the clock speed of at least one processor (possibly placing it into a stopped sleep mode) when the detected level of parallelism falls below a threshold level for more than a threshold amount of time. This effectively builds some degree of hysteresis into the control and so avoids the control system continuously oscillating about a desired level.

It can be difficult to predict what degree of parallelism will be achieved when an increased number of processor cores are available for multi-processing operation. Accordingly, in preferred embodiments the clock speed controller is operable to speculatively wake a processor from a sleep mode and then determine a level of parallelism that is achieved. Periodic speculative waking in this way is a good technique for ensuring that parallelism is exploited to reduce energy consumption when possible and in a wide variety of different situations.

Viewed from another aspect the present invention provides a method of processing data, said method comprising the steps of:

executing a plurality of streams of program instructions with respective ones of a plurality of processors, said plurality of streams of program instructions being separate processing threads within a multi-processing environment; and selecting with a clock speed controller one of a plurality of different non-zero clock speeds as a clock signal controlling execution of program instructions by at least one of said processors, whereby said clock speed may be reduced by said clock speed controller to reduce energy consumption of said plurality of processors in accordance with a required processing rate of said plurality of processors.

Viewed from a further aspect the present invention provides a computer program product including a computer program operable to control a plurality of processors, said plurality of processors being operable to execute respective streams of program instructions, said respective streams of program instructions being separate processing threads within a multi-processing environment wherein said computer program comprises:

clock speed controlling code operable to select one of a plurality of different non-zero clock speeds as a clock signal controlling execution of program instructions by at least one of said processors, whereby said clock speed may be reduced by said clock speed controlling code to reduce energy consumption of said plurality of processors in accordance with a required processing rate of said plurality of processors.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
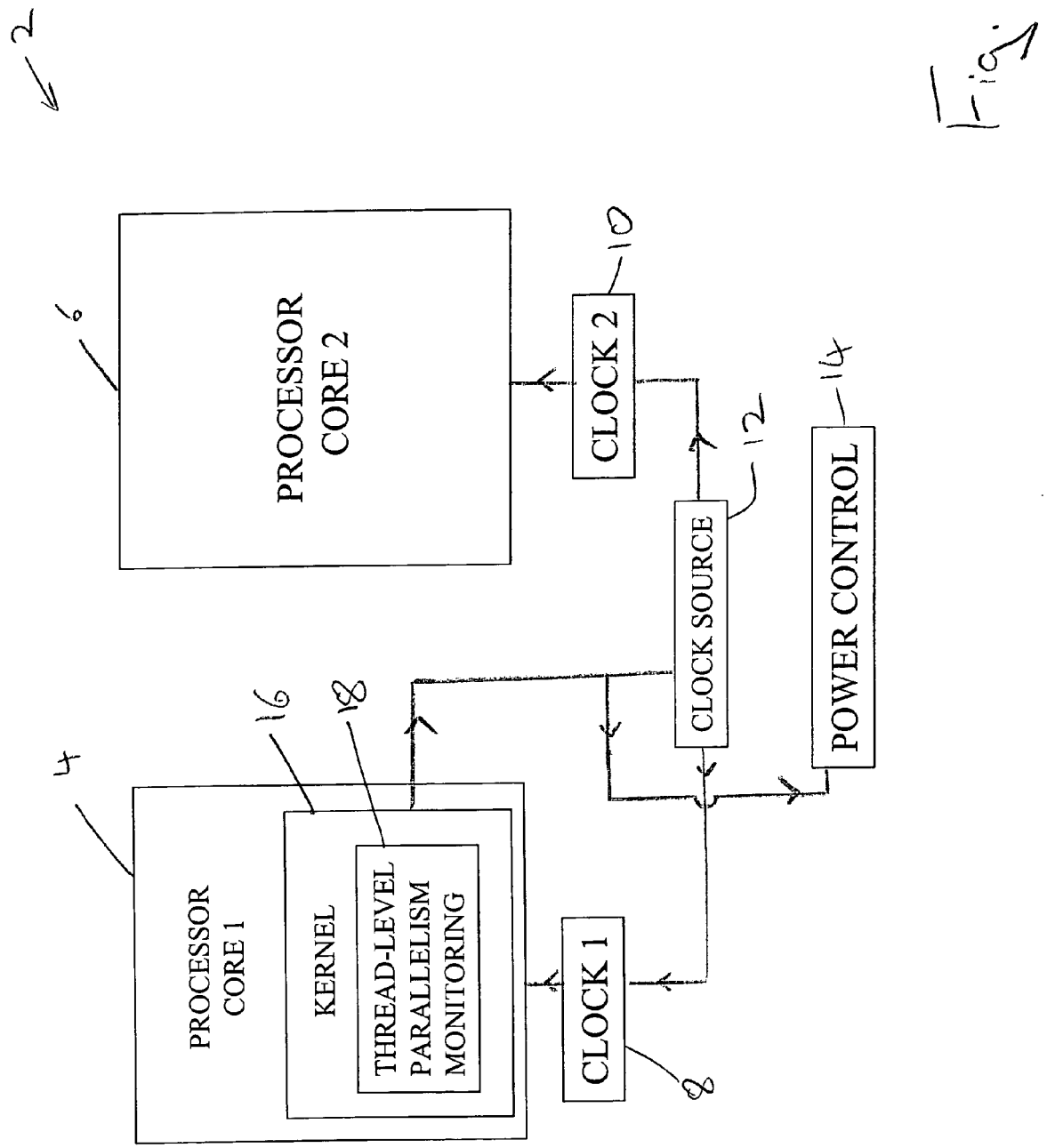
FIG. 1 schematically illustrates a first example embodiment using two processor cores and a common voltage domain with the clock speed controlling algorithm being run by one of the processor cores.

FIG. 1 illustrates a data processing apparatus 2 which provides a multi-processor environment having a first general purpose processor core 4 and a second general purpose processor core 6 which cooperate in executing respective streams of program instructions. This general type of multi-processing arrangement and the general manner of conducting multi-processing operations is known in this technical field and will not be described further herein.

The first processor core 4 is supplied with a first clock signal generated by a first clock generator 8. The second processor core 6 is supplied with a second clock signal supplied by a second clock signal generator 10. Both the first clock signal generator 8 and the second clock signal generator 10 derive their respective clocks from a common clock source 12. It will be appreciated that the use of a common clock source 12 allows the respective clock signals to have a stable and well determined relationship. In many practical cases the two clock signals will be the same clock signal with a fixed phase relationship. The use of the same clock signals for both the first processor core 4 and the second processor core 6 simplifies the design in that a common supply voltage may be applied to both of the processor cores 4, 6. In particular, given that they are clocked at the same frequency then the same voltage level is needed to support that frequency. When the clock signals are reduced in frequency for both processor cores 4, 6, then the power controller 14 reduces the supply voltage for both of the processor cores 4, 6 accordingly. The reduced clock speed and the reduced operating voltage both contribute to a reduction in energy consumption.

In this example embodiment, the first processor 4 executes an operating system including an operating system kernel 16. Within this operating system kernel a software algorithm provides the function of a clock speed controller 18 which monitors the thread level parallelism between the first processor core 4 and the second processor core 6. This thread level parallelism is a measure of the number of threads concurrently executing when at least one thread is executing as will be explained later. Other measures of parallelism may also be used.

The clock speed controller 18 detects the amount of thread level parallelism and when this rises above a given threshold instructs the clock source 12 and the power controller 14 to respectively reduce the clock speeds and supply voltages being supplied to the first processor core 4 and the second processor core 6. The greater the degree of thread level parallelism observed, then the more effectively the workload is being shared between the processor cores 4, 6 and accordingly the less rapidly they need to be clocked in order to achieve the required minimum performance level of the system as a whole. It will be seen that this clock speed control is a dynamic process with measurements being repeatedly taken and used to select different non-zero clock speeds as appropriate. There are several different non-zero clock speeds supported by the clock source 12 with these each having a respective supply voltage level which is needed to support them and which is supplied by the power controller 14 when they are selected. It will be appreciated that it is possible to additionally or alternatively use other performance-setting algorithms, such as idle time measurements, measurement of an achieved processing performance level etc.

Figure 2:
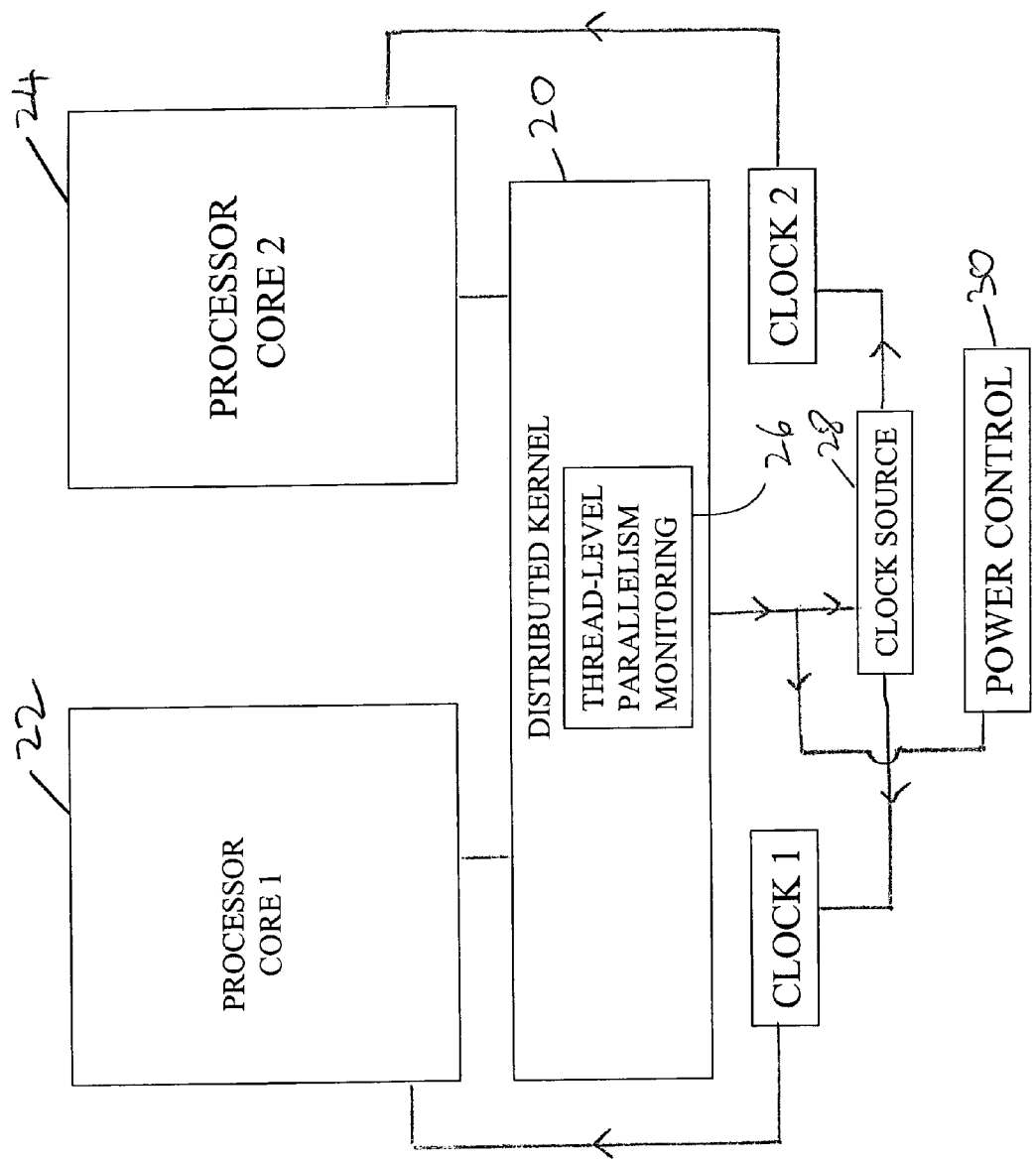
FIG. 2 schematically illustrates a second embodiment similar to that of FIG. 1 with the exception that the clock speed controlling algorithm is run within an operating system kernel which is distributed in its execution across two processor cores.

FIG. 2 illustrates a second example embodiment. This is similar to that of FIG. 1 except that the operating system kernel 20 in this case is a distributed kernel which executes on either or both of a first processor core 22 and a second processor core 24. This type of distributed kernel 20 is well known in the multi-processing field and will not be described herein further.

The clock speed controlling software 26 within the distributed kernel 20 again determines the thread level parallelism occurring at different times and uses the clock source 28 and the power controller 30 to vary the clock speeds being supplied to the first processor core 22 and the second processor core 24 as well as the supply voltage levels so as to meet the required performance level whilst reducing the amount of energy consumed. The power controller may additionally or alternatively use other performance controlling techniques such as adaptive body biasing accompanying the clock speed changes.

Figure 3:
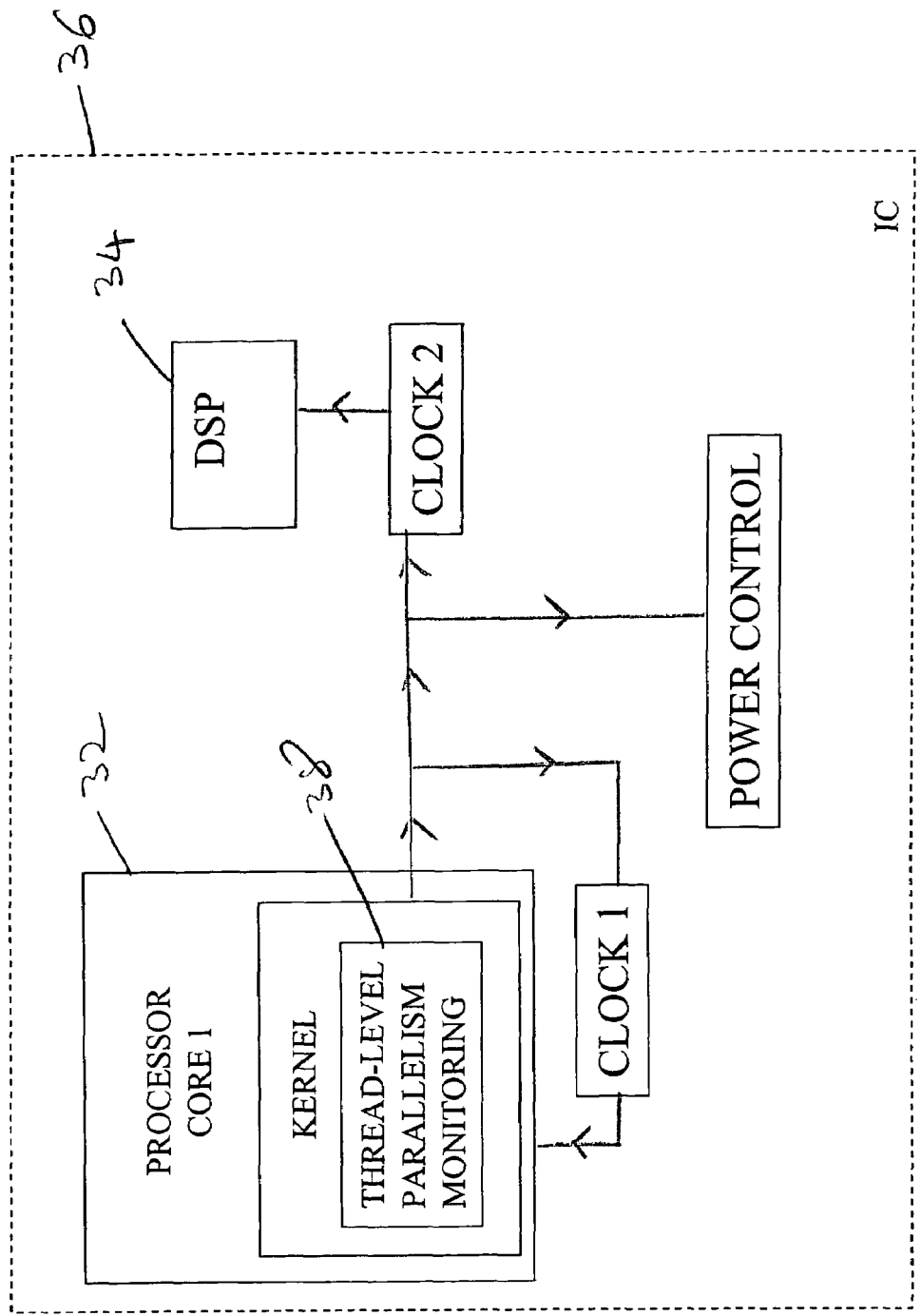
FIG. 3 schematically illustrates a third embodiment in which the two processors are a general purpose processor core and a digital signal processor or hardware accelerator engine.

FIG. 3 schematically illustrates a third embodiment. In this embodiment a general purpose processor core 32 and a digital signal processor 34 cooperate together to form a multi-processing system. It will be appreciated that the processors involved in such multi-processing systems can take a variety of different forms, such as general purpose processor cores, digital signal processor cores, reconfigurable processor cores (such as an FPGA programmed to execute a program instruction stream) and application specific processor cores (such as a general purpose processor core extended with certain application specific instructions, as may be the case with configurable processor cores).

The system of FIG. 3 is formed on a common integrated circuit 36 and again the clock speed controller 38 serves to measure the level of parallelism occurring and dynamically controls the clocks which are being supplied to the first processor core 32 and the DSP 34 (or hardware accelerator engine, re-configurable core, FPGA, ASIC etc). so as to reduce the energy consumption by slowing the clocks and lowering the supply voltage when parallelism is high and the system can meet its performance targets without the need for higher clock speeds.

Figure 4:
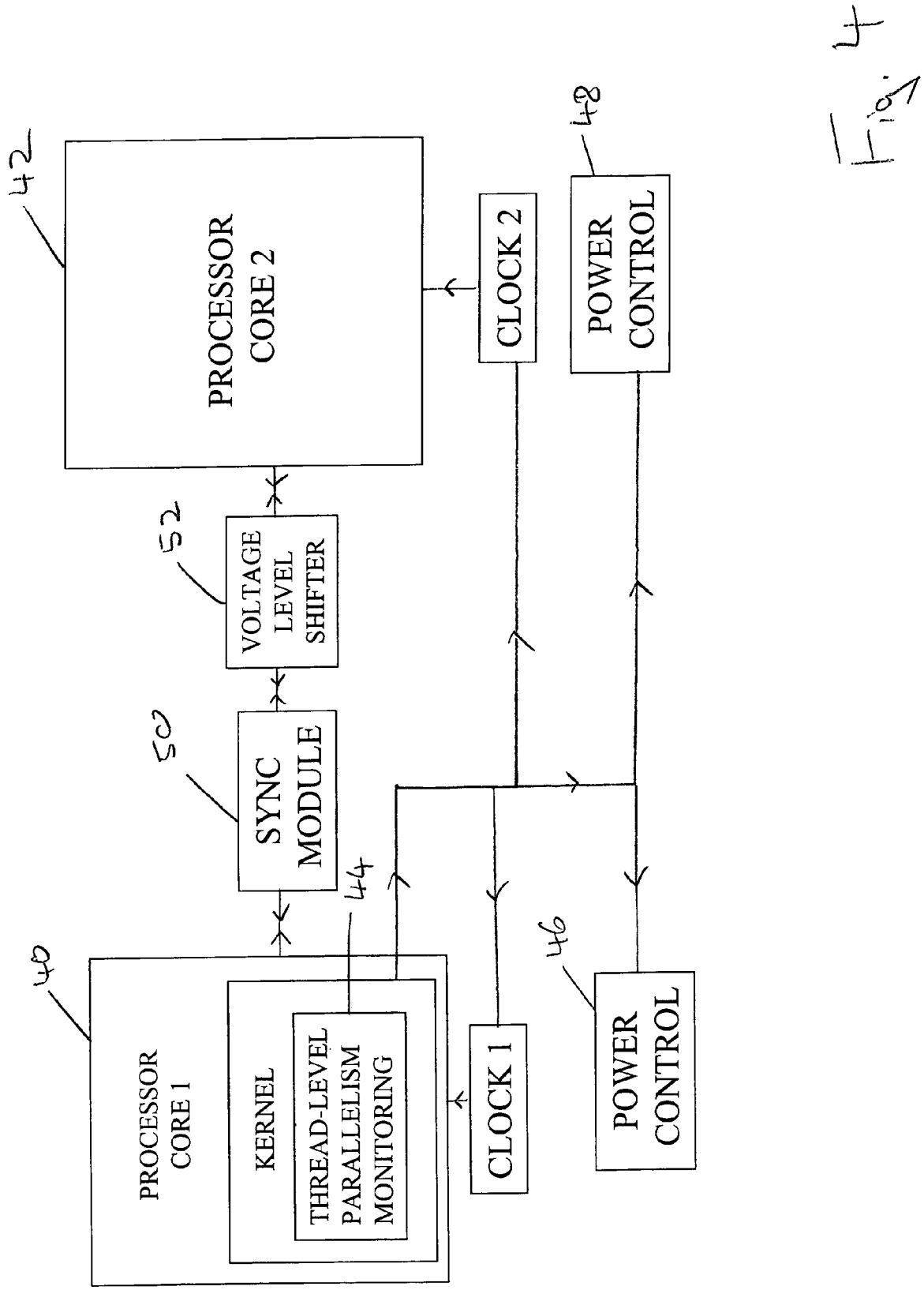
FIG. 4 schematically illustrates a fourth embodiment in which two voltage domains are used.

FIG. 4 illustrates a fourth embodiment. This embodiment is similar to that of FIG. 1 except that in this case the first processor core 40 and the second processor core 42 are asymmetrically controlled by the clock speed controller 44. More particularly, this asymmetric control allows clocks of different speeds to be simultaneously supplied to respective ones of the first processor core 40 and the second processor core 42. Thus, the first processor core 40 may be supplied with a relatively fast clock whilst the second processor core 42 is being supplied with a relatively slow clock. Accompanying these different speed clocks the integrated circuit upon which the first processor core 40 and the second processor core 42 are both formed may be split into multiple voltage domains with respective power controllers 46, 48. Thus, the second processor core 42 may have its clock speed reduced and its supply voltage lowered so as to reduce energy consumption by the second processor core 42 whilst the first processor core 40 maintains a high speed clock and a higher supply voltage needed for that high speed clock.

When using different clock speeds and voltage levels in the first processor core 40 and the second processor core 42 it will be appreciated that a synchronisation module 50 and a voltage level shifter 52 is provided between the first processor core 40 and the second processor core 42 to deal with clock synchronisation issues and the different supply voltage levels (voltage signalling levels) between the two domains.

The asymmetric control of FIG. 4 may be highly energy efficient since the thread level parallelism may be observed and the clock speeds and voltage levels of each respective processor adjusted so that each is operating at the full capacity allowed by its clock and voltage level in a manner that meets the desired performance requirements without wasting energy by providing performance in excess of that which is required.

Figure 5:
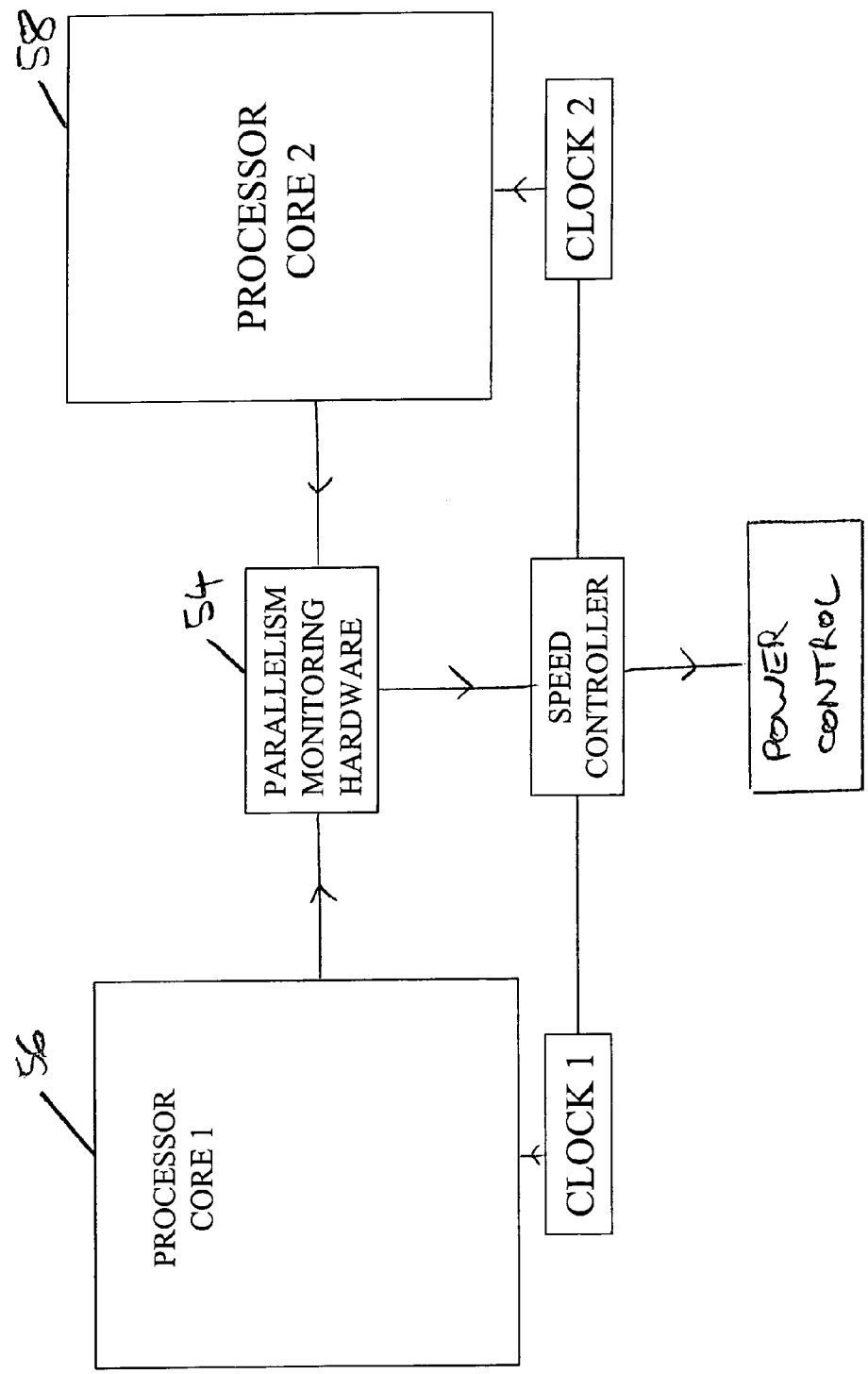
FIG. 5 schematically illustrates a fifth embodiment in which a hardware based parallelism monitoring unit is used.

FIG. 5 illustrates an embodiment similar to that of FIG. 4 except in this case parallelism monitoring hardware 54 is provided which monitors the processing activity of the first processor core 56 and the second processor core 58 to determine when they are simultaneously executing a stream of program instructions. The parallelism monitoring hardware 54 can be arranged to distinguish the execution of NOP instructions detecting these as a special case when one of the processor cores is effectively in an idle loop. This enables a distinction to be made between the case when both processors are executing program instructions from respective streams of program instructions that are doing useful work and the situation when one or more of the processors 56, 58 is in an idle loop. It will be appreciated that many processors do not use idle loop and are instead stopped when they are not busy.

Figure 6:
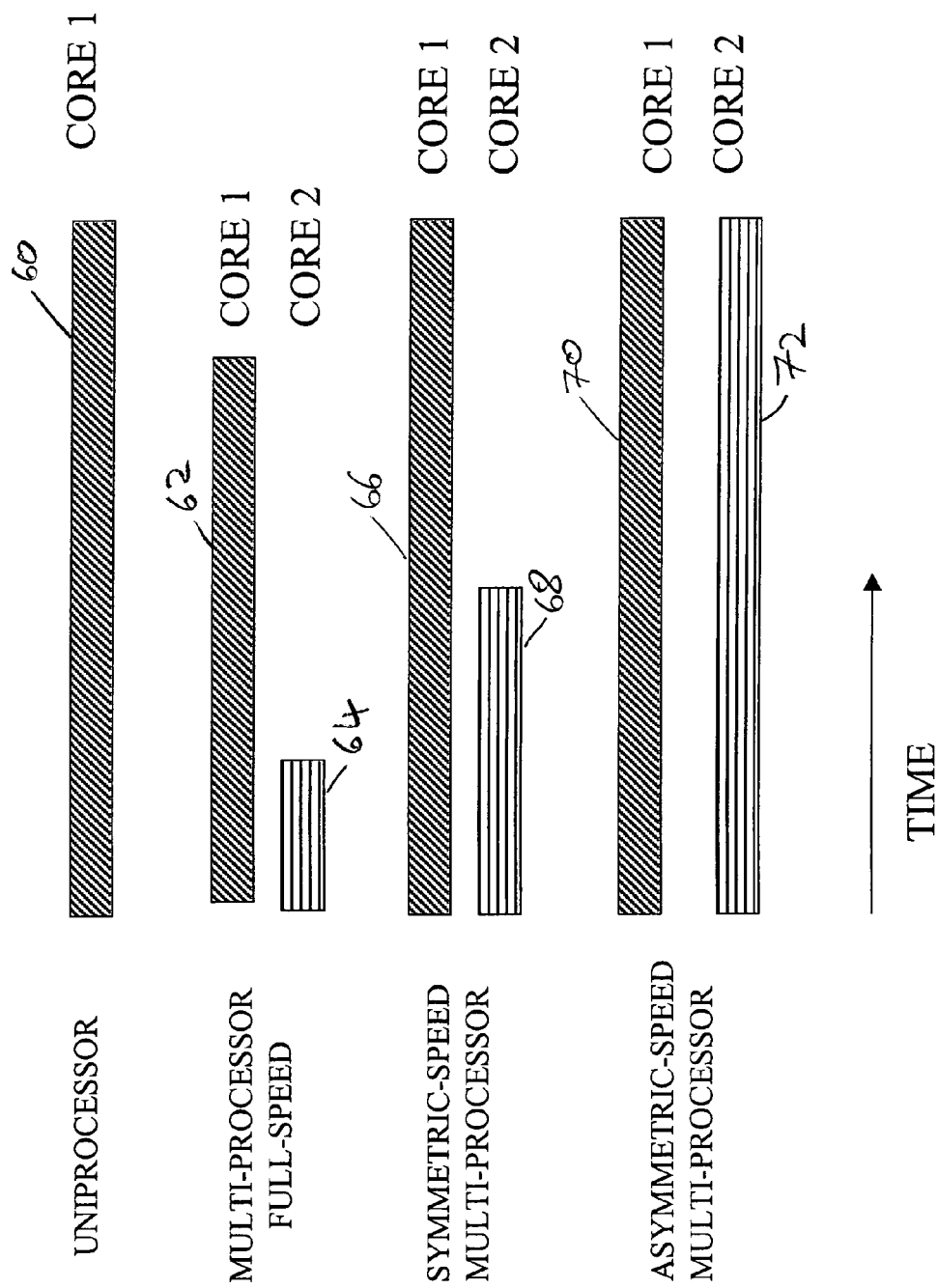
FIG. 6 schematically illustrates different ways in which multi-processor systems may be operated and give equivalent throughput with different configurations.

FIG. 6 schematically illustrates the use of the present technique in different ways. The bar 60 illustrates a full processor load for a uni-processor system. In this case the uni-processor is operating a maximum processing load. The bars 62, 64 illustrate the respective processing loads in a multi-processor system having a first core and a second core. This multi-processor system is clocked at the same speed as the uni-processor system with the result that since the processing load is shared between the processors each is operating below its maximum capacity. Since both of the processors are being clocked at the same speed and supplied with the same supply voltage it is likely that more energy is consumed with this arrangement than is the case in the uni-processor system.

The bars 66, 68 illustrate the multi-processor system discussed above but in this case with the clock speed supplied to both processors and the associated supply voltage level being reduced such that the most heavily worked of the two processor cores is again at its maximum capacity. Since the clock speeds have been reduced and accordingly the voltage level has been reduced, then it is likely that this arrangement will consume less energy than the uni-processor arrangement.

The bars 70, 72 illustrate a modification of the system in which the clock speeds are asymmetrically dynamically controlled. In this case as illustrated by the bars 70, 72, the clock speeds are controlled such that the workload is shared between the two processors and the clock speed and voltage level of each processor is adjusted such that each operates at full capacity for its clock speed and voltage level. This can further reduce the energy consumption.

Figure 7:
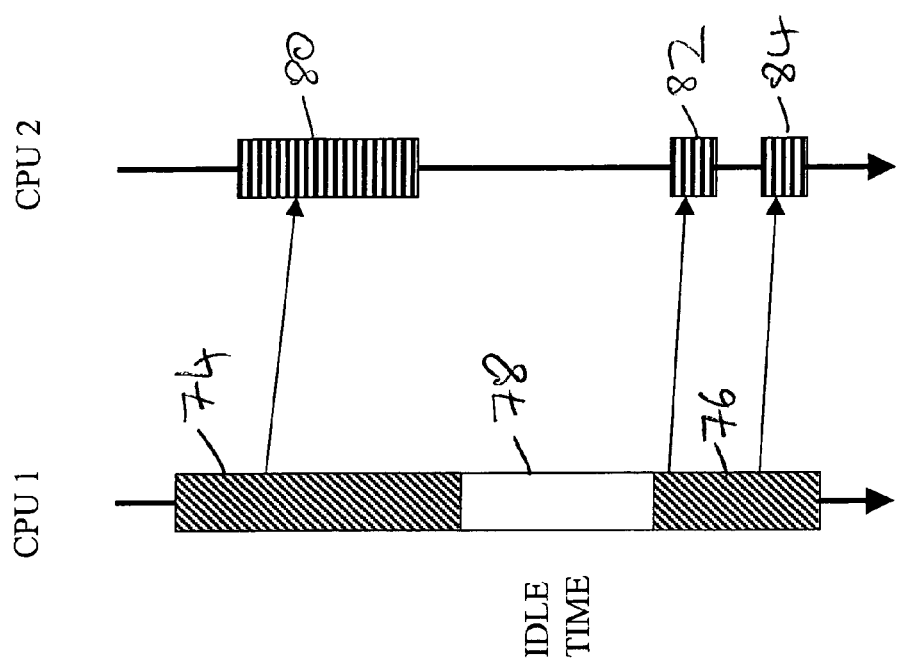
FIG. 7 illustrates a measure of thread level parallelism.

FIG. 7 illustrates a measure of thread level parallelism. A first CPU is busy during periods 74, 76 and idle during a period 78. A second processor core is busy during periods 80, 82 and 84. An operating system kernel executing on the first processor core can periodically measure whether both its own processor core and the second processor core are simultaneously executing program instructions of respective program instruction streams and so achieving thread level parallelism. If the first processor core is in the idle time 78, then no measurement is made since in this circumstance with the master processor idle there will not be any processing activity on the further processors. This technique of thread level parallelism measurement is further described in "Thread-Level Parallelism and Interactive Performance of Desktop Applications" by Krisztian Flautner, et al. ASPLOS Aug. 21, 2000.

Figure 8:
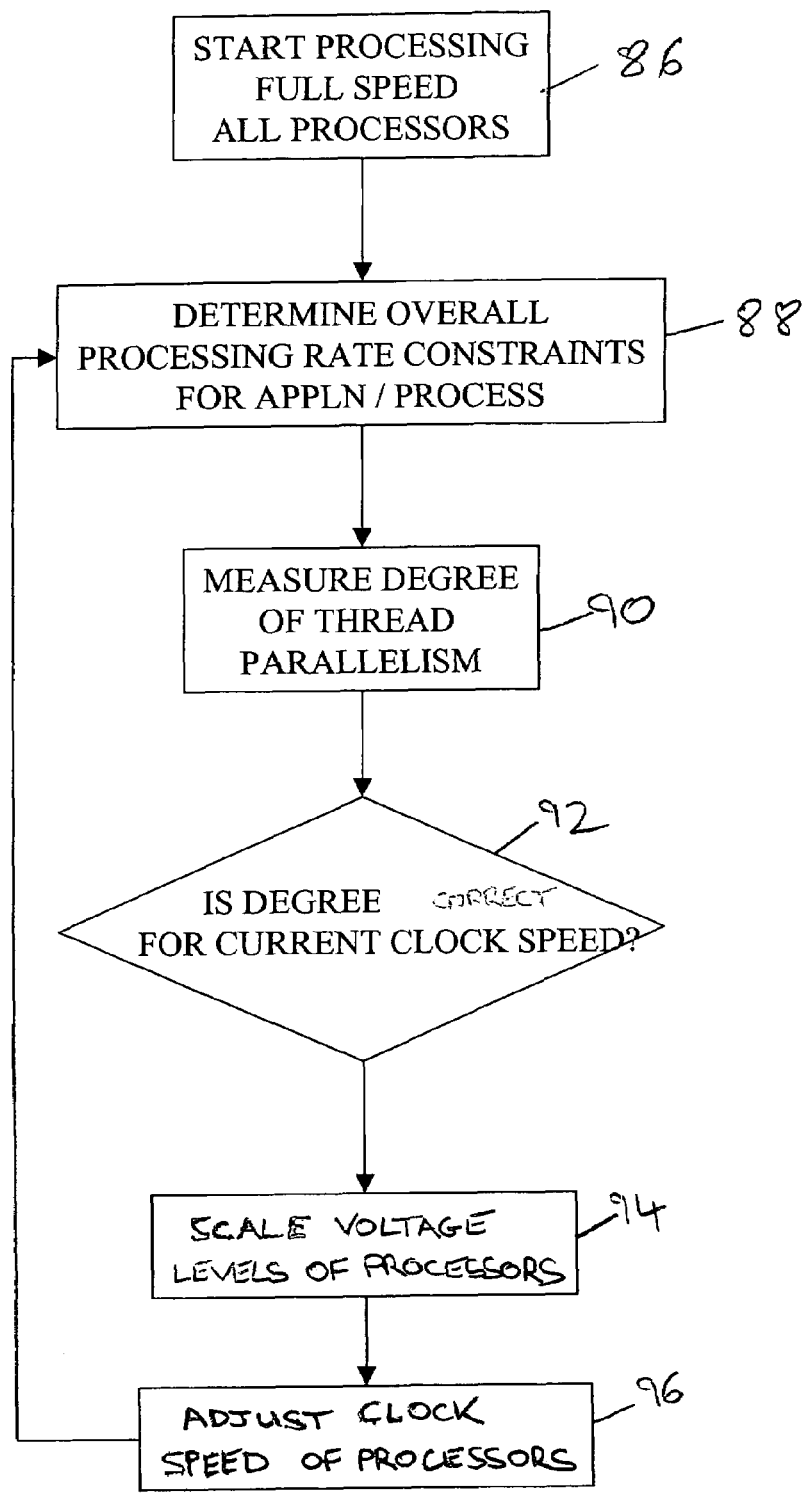
FIG. 8 is a flow diagram schematically illustrating the control of clock rate within a multi-processor environment.

FIG. 8 is a flow diagram illustrating the control of clock speed in a multi-processing environment. At step 86 the processors are started and initialised operating at their full clock speeds and with their full supply voltage levels. This enables a rapid boot. At step 88 a determination is made of a required processing performance level which needs to be provided by the multi-processing environment. At step 90 a measure is made of the degree of thread level parallelism. At step 92 a determination is made as to whether the degree of parallelism measured at step 90 matches the current clock speed being supplied to the processors. If the degree of parallelism measured is sufficiently high, then the required level of processing performance necessary can be achieved with lower clock speeds and accordingly step 94 scales the voltage levels and then step 96 lowers the clock speed. Alternatively, if the degree of parallelism is sufficiently low then the voltage levels are increased at step 94 followed by an increase in clock speed at step 96 such that the desired processing performance can be achieved. It will be appreciated that other parameters might also be controlled as part of this performance level control, e.g. voltage level first, body bias and then clock speed. The other of the changes made needs to be considered to ensure proper operation, e.g. a higher voltage level may need to be established before a higher clock speed can reliably be used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   a plurality of processors operable to execute respective streams of program instructions, said respective streams of program instructions being separate processing threads within a multi-processing environment; and
   a clock speed controller for selecting one of a plurality of different non-zero clock speeds as a clock signal controlling execution of program instructions by at least one of said processors, whereby said clock speed may be reduced by said clock speed controller to reduce energy consumption of said apparatus in accordance with a required processing rate of said apparatus, wherein said clock speed controller is responsive to a detected level of parallelism between respective streams of currently executing program instructions to dynamically select said clock signal for use in future processing.

2. Apparatus as claimed in claim 1, comprising a parallelism detector being one of:
a hardware circuit detecting parallel processing activity of said plurality of processors; and
one of said processors executing a parallelism detecting algorithm.

3. Apparatus as claimed in claim 1, wherein said clock speed controller is responsive to a detected level of thread level parallelism.

4. Apparatus as claimed in claim 3, wherein said detected level of thread level parallelism includes parallelism between independent processes and parallelism within a single process.

5. Apparatus as claimed in claim 3, wherein said thread level parallelism is a measure of how many parallel threads are executing for periods when at least one thread is executing.

6. Apparatus as claimed in claim 1, wherein said plurality of processors are operable to execute respective streams of program instructions under control of a respective clock signal having a plurality of different clock speeds.

7. Apparatus as claimed in claim 6, wherein said plurality of processors share a common clock speed and a common clock source.

8. Apparatus as claimed in claim 6, wherein said plurality of processors have independently adjustable clock speeds.

9. Apparatus as claimed in claim 1, wherein said plurality of processors are formed on a single integrated circuit.

10. Apparatus as claimed in claim 1, wherein said clock speed controller comprises at least one of said processors executing a clock speed controlling algorithm.

11. Apparatus as claimed in claim 10, wherein said clock speed controlling algorithm is part of an operating system kernel.

12. Apparatus as claimed in claim 11, wherein said operating system kernel is distributed between said plurality of processors.

13. Apparatus as claimed in claim 1, wherein said apparatus has a maximum required processing workload and when operating below said maximum required processing workload said clock speed controller selects said clock speed to be less than a maximum clock speed for said at least one processor.

14. Apparatus as claimed in claim 1, wherein said clock speed controller is also operable to control a supply voltage level for said at least one processor such that said supply voltage level is reduced as said clock speed is reduced.

15. Apparatus as claimed in claim 14, wherein said clock speed controller is operable such that processors operating at different clock speeds are provided with different supply voltage levels.

16. Apparatus as claimed in claim 1, wherein said clock speed controller is responsive to a determination of a potential level of parallelism above a threshold level of parallelism to wake a processor from a sleep mode into a clock mode such that said processor may execute a parallel stream of program instructions.

17. Apparatus as claimed in claim 1, wherein said plurality of processors are a plurality of general purpose processor cores.

18. Apparatus as claimed in claim 1, wherein said plurality of processors include at least one of:
a general purpose processor;
a reconfigurable processor;
a hardware accelerator engine;
an application specific processor; and
a digital signal processor.

19. Apparatus as claimed in claim 1, wherein said clock speed controller is operable to reduce said clock speed of at least one processor when said detected level of parallelism has fallen below a threshold level for more than a threshold amount of time.

20. Apparatus as claimed in claim 16, wherein said clock speed controller is operable to speculatively wake said processor from said sleep mode to determine said level of parallelism that may be achieved.

21. A method of processing data, said method comprising the steps of:
executing a plurality of streams of program instructions with respective ones of a plurality of processors, said plurality of streams of program instructions being separate processing threads within a multi-processing environment; and
selecting with a clock speed controller one of a plurality of different non-zero clock speeds as a clock signal controlling execution of program instructions by at least one of said processors, whereby said clock speed may be reduced by said clock speed controller to reduce energy consumption of said plurality of processors in accordance with a required processing rate of said plurality of processors, wherein said clock speed controller is responsive to a detected level of parallelism between respective streams of currently executing program instructions to dynamically select said clock signal for use in future processing.

22. A method as claimed in claim 21, comprising detecting parallelism with a parallelism detector being one of:
a hardware circuit detecting parallel processing activity of said plurality of processors; and
one of said processors executing a parallelism detecting algorithm.

23. A method as claimed in claim 21, wherein said clock speed controller is responsive to a detected level of thread level parallelism.

24. A method as claimed in claim 23, wherein said detected level of thread level parallelism includes parallelism between independent processes and parallelism within a single process.

25. A method as claimed in claim 23, wherein said thread level parallelism is a measure of how many parallel threads are executing for periods when at least one thread is executing.

26. A method as claimed in claim 21, wherein said plurality of processors are operable to execute respective streams of program instructions under control of a respective clock signal having a plurality of different clock speeds.

27. A method as claimed in claim 26, wherein said plurality of processors share a common clock speed and a common clock source.

28. A method as claimed in claim 26, wherein said plurality of processors have independently adjustable clock speeds.

29. A method as claimed in claim 21, wherein said plurality of processors are formed on a single integrated circuit.

30. A method as claimed in claim 21, wherein said clock speed controller comprises at least one of said processors executing a clock speed controlling algorithm.

31. A method as claimed in claim 30, wherein said clock speed controlling algorithm is part of an operating system kernel.

32. A method as claimed in claim 31, wherein said operating system kernel is distributed between said plurality of processors.

33. A method as claimed in claim 21, wherein said plurality of processors have a maximum required processing workload and when operating below said maximum required processing workload said clock speed controller selects said clock speed to be less than a maximum clock speed for said at least one processor.

34. A method as claimed in claim 21, wherein said clock speed controller is also operable to control a supply voltage level for said at least one processor such that said supply voltage level is reduced as said clock speed is reduced.

35. A method as claimed in claim 34, wherein said clock speed controller is operable such that processors operating at different clock speeds are provided with different supply voltage levels.

36. A method as claimed in claim 21, wherein said clock speed controller is responsive to a determination of a potential level of parallelism above a threshold level of parallelism to wake a processor from a sleep mode into a clock mode such that said processor may execute a parallel stream of program instructions.

37. A method as claimed in claim 21, wherein said plurality of processors are a plurality of general purpose processor cores.

38. A method as claimed in claim 21, wherein said plurality of processors include at least one of:
 a general purpose processor;
 a reconfigurable processor;
 a hardware accelerator engine;
 an application specific processor; and
 a digital signal processor.

39. A method as claimed in claim 21, wherein said clock speed controller is operable to reduce said clock speed of at least one processor when said detected level of parallelism has fallen below a threshold level for more than a threshold amount of time.

40. A method as claimed in claim 36, wherein said clock speed controller is operable to speculatively wake said processor from said sleep mode to determine said level of parallelism that may be achieved.

41. A computer program product including a computer program operable to control a plurality of processors, said plurality of processors being operable to execute respective streams of program instructions, said respective streams of program instructions being separate processing threads within a multi-processing environment wherein said computer program comprises:
 clock speed controlling code for selecting one of a plurality of different non-zero clock speeds as a clock signal controlling execution of program instructions by at least one of said processors, whereby said clock speed may be reduced by said clock speed controlling code to reduce energy consumption of said plurality of processors in accordance with a required processing rate of said plurality of processors, wherein said clock speed controlling code is responsive to a detected level of parallelism between respective streams of currently executing program instructions to dynamically select said clock signal for use in future processing.

42. A computer program product as claimed in claim 41, comprising detecting parallelism with a parallelism detector being one of:
 a hardware circuit detecting parallel processing activity of said plurality of processors; and
 one of said processors executing a parallelism detecting algorithm.

43. A computer program product as claimed in claim 41, wherein said clock speed controlling code is responsive to a detected level of thread level parallelism.

44. A computer program product as claimed in claim 43, wherein said detected level of thread level parallelism includes parallelism between independent processes and parallelism within a single process.

45. A computer program product as claimed in claim 43, wherein said thread level parallelism is a measure of how many parallel threads are executing for periods when at least one thread is executing.

46. A computer program product as claimed in claim 41, wherein said plurality of processors are operable to execute respective streams of program instructions under control of a respective clock signal having a plurality of different clock speeds.

47. A computer program product as claimed in claim 46, wherein said plurality of processors share a common clock speed and a common clock source.

48. A computer program product as claimed in claim 46, wherein said plurality of processors have independently adjustable clock speeds.

49. A computer program product as claimed in claim 41, wherein said plurality of processors are formed on a single integrated circuit.

50. A computer program product as claimed in claim 41, wherein said clock speed controlling code comprises a clock speed controlling algorithm executed by at least one of said processors.

51. A computer program product as claimed in claim 50, wherein said clock speed controlling algorithm is part of an operating system kernel.

52. A computer program product as claimed in claim 51, wherein said operating system kernel is distributed between said plurality of processors.

53. A computer program product as claimed in claim 41, wherein said plurality of processors have a maximum required processing workload and when operating below said maximum required processing workload said clock speed controller selects said clock speed to be less than a maximum clock speed for said at least one processor.

54. A computer program product as claimed in claim 41, wherein said clock speed controlling code is also operable to control a supply voltage level for said at least one processor such that said supply voltage level is reduced as said clock speed is reduced.

55. A computer program product as claimed in claim 54, wherein said clock speed controlling code is operable such that processors operating at different clock speeds are provided with different supply voltage levels.

56. A computer program product as claimed in claim 41, wherein said clock speed controlling code is responsive to a determination of a potential level of parallelism above a threshold level of parallelism to wake a processor from a sleep mode into a clock mode such that said processor may execute a parallel stream of program instructions.

57. A computer program product as claimed in claim 41, wherein said plurality of processors are a plurality of general purpose processor cores.

58. A computer program product as claimed in claim 41, wherein said plurality of processors include at least one of:
 a general purpose processor;
 a reconfigurable processor;

an application specific processor; and
a digital signal processor.

59. A computer program product as claimed in claim 41, wherein said clock speed controlling code is operable to reduce said clock speed of at least one processor when said detected level of parallelism has fallen below a threshold level for more than a threshold amount of time.

60. A computer program product as claimed in claim 56, wherein said clock speed controlling code is operable to speculatively wake said processor from said sleep mode to determine said level of parallelism that may be achieved.

* * * * *